(12) United States Patent
Huang et al.

(10) Patent No.: US 9,578,709 B2
(45) Date of Patent: **\*Feb. 21, 2017**

(54) MULTI-FUNCTION LIGHTING SYSTEM

(71) Applicant: INDUSTRIAL TECHNOLOGY RESEARCH INSTITUTE, Hsinchu (TW)

(72) Inventors: Sheng-Ho Huang, Kaohsiung (TW); Hung-Lieh Hu, Hsinchu (TW); Chen-Kun Chen, Lugang Town (TW); Yu-Chen Yu, Taoyuan County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/485,886

(22) Filed: Sep. 15, 2014

(65) Prior Publication Data

US 2015/0002027 A1    Jan. 1, 2015

Related U.S. Application Data

(63) Continuation of application No. 13/237,775, filed on Sep. 20, 2011, now Pat. No. 8,847,508.

(30) Foreign Application Priority Data

Jan. 31, 2011    (TW) .............................. 100103720 A

(51) Int. Cl.
*H05B 37/02*    (2006.01)
*H05B 33/08*    (2006.01)

(52) U.S. Cl.
CPC ...... *H05B 33/0854* (2013.01); *H05B 33/0872* (2013.01); *H05B 37/029* (2013.01); *H05B 37/0227* (2013.01); *H05B 37/0245* (2013.01)

(58) Field of Classification Search
CPC . H05B 37/02; H05B 33/0872; H05B 33/0854; H05B 37/0227; H05B 37/029; H05B 37/0245
(Continued)

(56) References Cited

U.S. PATENT DOCUMENTS 6,156,743 A    12/2000    Whitcomb
6,236,622 B1    5/2001    Blackman
(Continued)

FOREIGN PATENT DOCUMENTS

TW    200952034    12/2009
TW    I323767    4/2010
TW    M381999    6/2010

OTHER PUBLICATIONS

TW Office Action dated Dec. 27, 2013.
(Continued)

*Primary Examiner* — Tung X Le
(74) *Attorney, Agent, or Firm* — McClure, Qualey & Rodack, LLP

(57) ABSTRACT

A multi-function lighting system is provided. A design of multiplex configuration of a multi-diode lighting module and a design of optical time domain modulation of an electric controlling system are applied to a lighting system which senses environmental conditions to automatically or artificially change a color, a light intensity and a color-temperature of a light to influence people's feelings and moods. At the same time, the environmental sensing device further feedbacks an information of humidity or temperature so that parameter of optimum light environment can be set accordingly. The multi-diode lighting module is applied to the design of the lighting system, such that the lighting system can be manufactured in a customization way to meet varied requirements in the landscaping and optical designs, not only reducing the cost and increasing mass production
(Continued)

rate but also providing multi-functions including landscaping lighting, ergonomic lighting, plant lighting and air purifying.

20 Claims, 7 Drawing Sheets

(58) Field of Classification Search
USPC ............... 315/149–159, 291, 292, 294, 297, 307,315/308, 309, 312, 360
See application file for complete search history.

(56) References Cited

U.S. PATENT DOCUMENTS

| | | | |
|---|---|---|---|
| 6,902,296 B2 | 6/2005 | Searfoss, III | |
| 7,295,180 B2* | 11/2007 | Ichikawa | G09G 3/342 315/308 |
| 7,320,532 B2 | 1/2008 | Searfoss, III | |
| 7,520,607 B2 | 4/2009 | Casper et al. | |
| 7,722,212 B2 | 5/2010 | Searfoss | |
| 8,253,681 B2* | 8/2012 | Hayashi | G09G 3/3426 345/102 |
| 8,427,419 B2 | 4/2013 | Ahn et al. | |
| 2005/0174473 A1 | 8/2005 | Morgan et al. | |
| 2006/0076908 A1* | 4/2006 | Morgan | H05B 33/0842 315/312 |
| 2007/0258240 A1 | 11/2007 | Ducharme et al. | |
| 2008/0265799 A1 | 10/2008 | Sibert | |
| 2009/0281604 A1 | 11/2009 | De Boer et al. | |
| 2010/0076250 A1 | 3/2010 | Van Woudenberg et al. | |
| 2010/0103660 A1* | 4/2010 | van de Ven | H01L 25/0753 362/231 |
| 2010/0328336 A1 | 12/2010 | Si | |
| 2011/0062888 A1 | 3/2011 | Bondy et al. | |

OTHER PUBLICATIONS

English language translation of abstract of TW 200952034 (published Dec. 16, 2009).
English language translation of abstract of TW M381999 (published Jun. 11, 2010).
Rea, M.S.; "Toward a Model of Visual Performance: Foundations and Data;" Journal of the Illuminating Engineering Society; Summer 1986; pp. 41-142.
"A Study on the Influence of Various Types and Spectral Characteristics of Artificial Lighting for Human Responses;" pp. 1-176; Jul. 9, 1997.
"A Study on the Influence of Illuminance and Color Temperature of Artificial Lighting on Visual Perception and Survey of Lighting Models-Using Living Room as an Example;" pp. 1-256.
Non-Final Office Action issued in U.S. Appl. No. 14/979,925, filed Dec. 28, 2015, mailed Jun. 9, 2016.

* cited by examiner

MULTI-FUNCTION LIGHTING SYSTEM

This is a Continuation of U.S. application Ser. No. 13/237,775, filed Sep. 20, 2011, now U.S. Pat. No. 8,847,508, which claims the benefit of Taiwan application Serial No. 100103720, filed Jan. 31, 2011, the subject matters of which are incorporated herein by reference.

BACKGROUND

Technical Field

The disclosure relates in general to a multi-function lighting system, and more particularly to a lighting system with the functions of landscaping lighting, ergonomic lighting, plant lighting and air purifying.

Description of the Related Art

In recent years, people's requirements of living environment are getting higher and higher, and it is popular that people match the light colors with the decorative or artistic shapes of the lighting lamps, so that the surrounding space emanates certain atmospheres and moods, user's stylistic features can manifested, and environmental aesthetics is enhanced. Eventually, the living space further satisfies user's needs both physiological and psychological, and provides the user with enjoyable aesthetics and balance between the body and the mind.

Modern landscaping and space design places particular focus in the study of ergonomic engineering, environmental psychology, and aesthetic psychology with an aim to resolving people's requirements of their living environment in the aspects of physiological characteristics, behavior psychology and visual experience through scientific methods. The matching between light environment and colors is an important element in the design of landscaping and living environment, which affect people's physical and mental state by modulating the spectrum of the lighting lamp, and optical parameters such as light intensity and color temperature. To harmonize the color of the space with the atmosphere through plants is a common practice in environmental design.

Research literatures show that through the use of illumination light, an environment with different scenarios which give people different feelings can be created. For example, as the spectrum energy of orange waveband (595 nm to 620 nm) increases, people will feel more comfortable, relaxed and spirited. Under the illumination environment with the color temperature being equal to 6500 K, as the spectrum energy of the blue waveband (435 nm to 490 nm) increases, people's internal organs related to respiratory and circulatory system, urinary system and biliary tract system will be significantly affected. High color temperature and high illumination (such as 6500 K and 450 lux) makes people feel excited. Low color temperature and middle illumination (such as 3200 K and 300 lux) makes people calm and peaceful. High color temperature and low illumination (such as 6500 K and 150 lux) makes people feel upset and depressed. Low color temperature and high illumination (such as 3200 K and 450 lux) feel unpleasant. In short, various combinations of illumination and color temperature affect people's moods and make them generate corresponding behaviors.

For example, red color helps to stimulate and excite people's nerve system, increase the secretion of epinephrine and enhance blood circulation. Green color has sedative effect, benefits those who are hyperactive or suppressed either physiological or psychological and helps the body to achieve balance and relieve dizziness, fatigue or negative emotion. Blue color environment provides a feeling of serenity and grace, and helps people to achieve internal balance. Blue color when used in a bedroom helps to relieve people of nervousness, headache, fever, dizziness, and insomnia. Yellow color stimulates people's nerve system and digestive system and enhances logic thinking. Orange color generates vitality, stimulates people's appetite and helps to maintain health, and is ideal for the places such as rumpus and kitchen.

In addition, light therapy has been widely used to improve the sleep and emotions of the sick or the seniors. Based on the response of the eyes when receiving the light, the light with special wavelengths and different light intensity levels is used for adjusting the timing at which melatonin is secreted by the pineal gland, so as to regulate people's biological clock to achieve a balanced rhythm and improve people's body temperature, sleep/wake cycle and action/rest rhythm.

A study of the environmental influence of plants on the indoor pathogen content and indoor humidity shows that when a substance volatilized from the leaves is mixed with the water vapor, the substances will suppress the growth of the pathogens in the air. Plants with high transpiration rate and large total foliar surface area help to increase indoor humidity and the dust in the air, so that the indoor air is effectively purified and the indoor air light quality is improved. Some plants help to absorb chemical substances that are hazardous to human body, and the disposition of indoor foliage plants helps to alleviate people of the symptoms of infection in the nose, throat, and respiratory system. Also, research literatures show that people's anxiety and nervousness can be alleviated when household landscaping includes natural view or indoor plants. In comparison to the urban landscaping, sports or other entertainments, viewing landscaping plants or natural environment does better in alleviating people's fatigue or restoring people's concentration. In addition, a workplace with green landscaping not only benefits people's physiology and psychology but also helps to reduce people's pressure and anxiety and further increases people's morale and efficiency in their work. A hospital ward with green plants is beneficial to patients' recovery, and at the same time help to reduce patients' feeling of pain, negative emotions and hospital stay.

The disposition of plants in an indoor space is indeed beneficial to people's health both physiologically and psychologically. However, plants lacking sunlight cannot conduct photosynthesis, and will wither soon or end up with poor growth. Research literatures show that, suitable amount of light intensity of red light (610 nm to 720 nm) or blue light (400 nm to 520 nm) or a combination thereof is conducive to the growth of the plants.

There are only a few number of related patents are provided. According to the Taiwanese Patent Publication No. TW 200952034 A1, a lamp, which is discharged by a low-pressure gas affecting the balance of endogenous melatonin is disclosed. The light in the region of red color spectrum is used for regulating the biological clock by controlling the secretion of melatonin.

In addition, a lamp with led chip for biological growth is disclosed in the Taiwanese Patent Publication No. TW M381999 U1. According to the said disclosure, a first LED and a second LED respectively emit a first waveband light source and a second waveband light source to assist biological growth.

A night light device, which assists baby's sleep with three different lighting modes is disclosed in the U.S. Pat. No. 6,902,296. The night light device further comprises a biological sensor which detects user's temperature, blood pressure and blood concentration and then switches to a suitable light mode automatically.

SUMMARY

The disclosure is directed to a multi-function lighting system. The lighting source automatically or artificially changes the color, the light intensity and the color-temperature of the light to create varied light environments that influence people's feelings and moods. At the same time, the environmental sensing device further feedbacks the information of humidity or temperature so that parameter of optimum light environment can be set accordingly. Thus, the lighting module can provide multi-functions of landscaping lighting, ergonomic lighting, plant lighting and air purifying.

According to an embodiment of the present disclosure, a multi-function lighting system is provided. The lighting system comprises at least a multi-diode lighting module and an electric controlling system. The lighting module control unit modulates the light quality (such as photochromic matching), the light intensity and the color temperature of the light generated by the multi-diode lighting module, so that the multi-diode lighting module generates at least two light source states corresponding to at least two scenarios.

The above and other aspects of the disclosure will become better understood with regard to the following detailed description of the non-limiting embodiment(s). The following description is made with reference to the accompanying drawings.

DETAILED DESCRIPTION

The disclosure is related to a multi-function light emitting diode (LED) lighting system. The lighting system of the disclosure which provides multi-functions in one single lighting module is applicable to the conventional LED packaging process. Furthermore, the whole module can be manufactured by the substrate integrated process (such as the integrated circuit process), the light quality, the light intensity and the color temperature of the light can be modulated, the modulation of the light can be realized by time domain implementation, the manufacturing process/ assembly can be modulized, and the light source module can be disposed in a customization way to meet design requirements. However, the embodiments disclosed below are for exemplification purpose only, not for limiting the scope of the disclosure.

Figure 1:
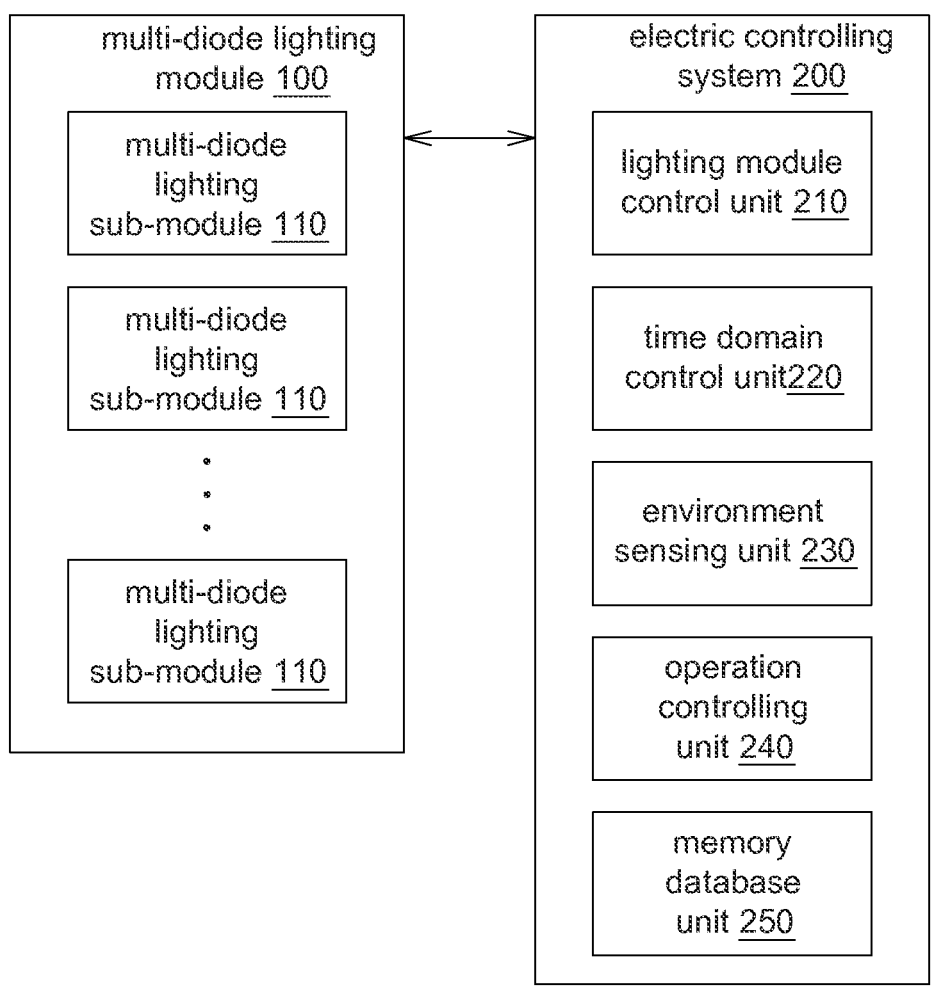
FIG. 1 shows a block diagram of a multi-function lighting system according to an embodiment of the disclosure.

Referring to FIG. 1, a block diagram of a multi-function lighting system 1000 according to an embodiment of the disclosure is shown. The multi-function lighting system 1000 of the present embodiment of the disclosure comprises one or more than one multi-diode lighting module 100 and an electric controlling system 200.

Figure 2:
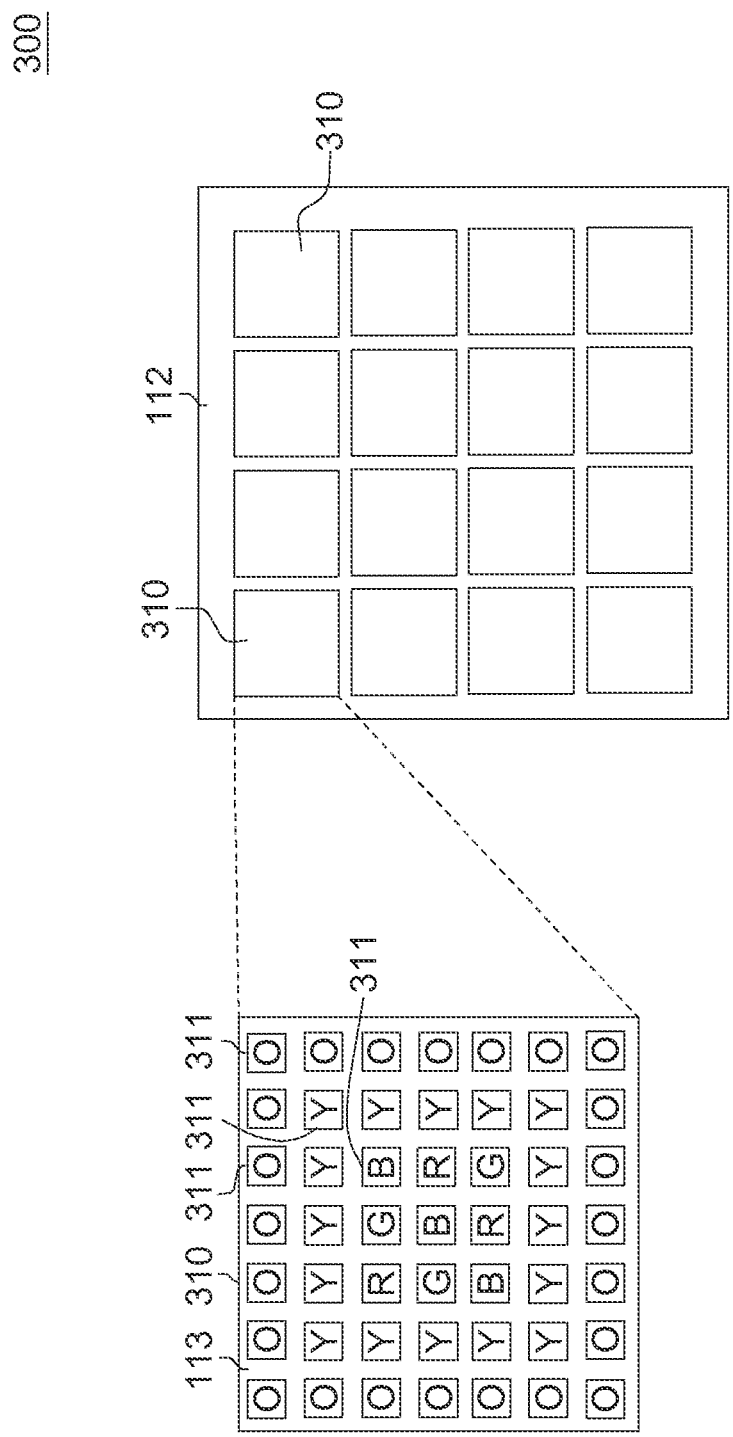
FIGS. 2 to 6 show various embodiments of a multi-diode lighting module.

Referring to FIG. 1 and FIG. 2. Exemplarily (but not restrictively), the multi-diode lighting module 100 is formed by integrating more than one multi-diode lighting sub-module 110 in a particular-material substrate 112.

Exemplarily, the multi-diode lighting sub-module 110 is formed by integrating the LED chips with different wavelengths or color temperatures and the LED packages in the particular-material substrate 113.

The multi-diode lighting module 100 can be modulized and manufactured by integrating the LEDs and the multi-diode lighting sub-modules 110 by the substrate integrated process (such as all integrated circuit process).

A conductive structure or a non-conductive structure can be disposed on the surface or in the interior of the particular-material substrate 112 and particular-material substrate 113, wherein the particular-material substrate 112 and the particular-material substrate 113 can be made from such as a metal conductor, a semiconductor, a ceramic material, a polymer material or a composite material. An electrical circuit (conductive structure) can be disposed on the surface or in the interior of the particular-material substrate 112 and the particular-material substrate 113 and used as a power and electric controlling signal line or an optical interconnection optical path (such as the light guide structure) for transmitting an optical signal.

A plurality of multi-diode lighting sub-modules 110 and a plurality of multi-diode lighting modules 100 are connected via circuits (or referred as a conductive structure) or an optical path (or referred as a light guide structure). The circuits provide a power and an electric controlling signal. The optical path controls the transmission and feedback of an optical signal. The circuits can be electrically connected through electrical wire, electrical circuit or module connection circuit. The optical path can be connected for transmitting an optical signal through optical fiber, optical waveguide or module connection optical path, wherein the optical waveguide comprises a polymer optical waveguide, a chemical compound optical waveguide, and a semiconductor optical waveguide. If the light source module has the design for transmitting the optical signal, then the optical transmitter, the optical receiver and the photoelectrical signal converter can be integrated in the light source sub-module or the light source module for performing photo-electrical signal conversion. If all light source module is integrally manufactured by substrate integrated process, then the optical transmitter, the optical receiver and the photoelectrical signal converter can be integrated as a light source module by the all integrated circuit process. The electric signal of the multi-diode lighting module 100 is processed and controlled by the electric controlling system 200. The multi-diode lighting module 100 basically forms a spectrum whose wavelengths comprise a red light, a green light, a blue light, a yellow light, an orange light, a white light and so on. Or, a light source with another spectrum can be formed by mixing a red light, a green light, a blue light LED as a white light or mixing other LED lights with different wavelengths. Furthermore, the multi-diode lighting module 100 can have different color temperatures. The multi-diode lighting module 100 can concurrently emit a light with more than one wavelength or the color temperature. The formation of the multi-diode lighting module 100 can include a far-infrared light LED, which is also used as a light source for controlling the growth of the plants (such as affecting the flowering of plants or the germination of seedlings) or a light source for the providing healthcare to people. For example, when the body is radiated by an infrared light, the skin will generate internal heat, pores will be expanded, perspirations will be secreted, metabolism will be stimulated and blood circulation will be accelerated, so as to convey oxygen and nutrition to the tissues, excrete metabolites with perspirations, replenish one's energy and relieve one from fatigue. The formation of the multi-diode lighting module 100 can include an ultra-velvet light LED, which is also used as a bactericidal or antibacterial light source (such as killing or suppressing the bacteria or germs in the air or the plants or killing or suppressing insects or pests).

The electric controlling system 200 comprises a lighting module control unit 210, a time domain control unit 220, an environment sensing unit 230, an operation controlling unit 240 and a memory database unit 250. The functions of the above elements of the electric controlling system 200 are disclosed below.

The lighting module control unit 210 individually modulates the light quality, the light intensity and the color temperature of the light generated by each multi-diode lighting sub-module 110 or the LED, or modulates the light quality, the light intensity and the color temperature of the light generated by part or all of the multi-diode lighting sub-modules 110 or part or all of the LEDs to generate a light environment applicable to various scenarios. That is, the controlling method of the multi-function lighting system 1000 comprises the steps of modulating the light quality of the light generated by the multi-diode lighting module 100; modulating the light intensity of the light generated by the multi-diode lighting module 100; and modulating the color temperature of the light generated by the multi-diode lighting module 100. For example, the lighting module control unit 210 individually modulates each multi-diode lighting sub-module 110 or each LED, or concurrently modulates part or all of the multi-diode lighting sub-modules 110 or part or all of the LEDs, so that the multi-diode lighting module 100 generates a monochromic spectrum, a polychromic spectrum or a mixed light spectrum. Or, the lighting module control unit 210 adjusts the light intensity of the multi-diode lighting module by way of individually modulating each multi-diode lighting sub-module 110 or each LED or concurrently modulating part or all of the multi-diode lighting sub-modules 110 or part or all of the LEDs.

The time domain control unit 220 controls each or part or all of the LEDs, each or part or all of the multi-diode lighting sub-modules 110 and each or part or all of the multi-diode lighting modules 100 according to a time parameter, so that the response of the light generated by the multi-function lighting system 1000 varies with the time. For example, the light quality and the color temperature of each multi-diode lighting sub-module 110 or each LED can be started or turned off along with the time or the light intensity of each multi-diode lighting sub-module 110 or each LED can be increased or decreased. Or, the light quality and the color temperature of part or all of the multi-diode lighting sub-modules 110 or part or all of the LEDs can be started or turned off along with the time or the light intensity of part or all of the multi-diode lighting sub-modules 110 or part or all of the LEDs can be increased or decreased.

The environment sensing unit 230 can integrate a temperature, humidity and light intensity sensor, an object movement sensor and a signal transmitter/receiver for sensing an environmental condition and controlling the multi-diode lighting module 100 accordingly. The environmental condition is such as a temperature, a humidity, an illumination of the space, the moving state of a human body in the space, or the combination thereof. For example, when the environment sensing unit 230 senses that a human body enters a room from another room, the environment sensing unit 230 turns on/off the multi-diode lighting module 100. Or, the environment sensing unit 230, after sensing that the temperature, the humidity or the light environment changes, modulates the light color or the light intensity of the light generated by the multi-diode lighting module 100 accordingly. For example, during the office hours, the light source is a white light. When the outdoor sunlight shines in the indoors, the multi-function lighting system 1000 automatically reduces the light intensity of the white light generated by multi-diode lighting module 100 through the lighting module control unit 210. Or, when the user would like to enter a relaxed or sleep state and there are indoor background lights, the multi-function lighting system 1000 automatically changes its photochromic matching and light intensity through the lighting module control unit 210. That is, when changes occur to the response of the light generated by the multi-function lighting system 1000 and the indoor background light environment, the multi-function lighting system 1000 automatically reduces or enhances the light color and the light intensity of the light generated by the multi-diode lighting module 100 through the lighting module control unit 210. Or, if the sensor detects that the indoor temperature or humidity is too high and may easily make people feel irritated, then the lighting system automatically adjusts the light color and the light intensity of the light to low color temperature and middle illumination, so that people's mood can be pacified. That is, if the environment sensing unit 230 detects that the indoor temperature or humidity deviate from the comfort zone, then the multi-function lighting system 1000 automatically adjusts its photochromic matching and light intensity through the lighting module control unit 210, so that the generated light environment can make people feel comfortable. Or, suppose the setting of light environment is to enter a sleep state. If the environment sensing unit 230 senses that a human body turns over, this implies that the user has not yet entered the sleep state or the sleep is still very light, then the multi-function lighting system 1000 does not modulate the original light environment for the sleep state, but automatically delay and change the modulation time of the light environment for the sleep state and the light source modulation periodical setting through the time domain control unit 220.

The operation controlling unit 240 modulates the light quality, the light intensity and the color temperature of the light generated by the multi-diode lighting module 100 according to a setting of light environment. The operation controlling unit 240 performs modulation in an automatic or artificial way. The operation controlling unit 240 can modulate the multi-diode lighting module 100 through cabled transmission or wireless transmission, wherein the user can modulate the light source through a hand-held control device, such as a hand-held remote controller.

The memory database unit 250 stores a light environment time domain parameter. Through 24 hour light environment sensing, the multi-diode lighting module 100 can set and store the optimum value of the light environment time domain parameter, such as the time for automatically modulating the spectrum and the light intensity of the light generated by the light source. Or, the user can adjust his/her personal preference, and the memory database unit 250 automatically records the user's personal preferences accordingly.

The multi-diode lighting module 100 of the disclosure can be manufactured in a customization way to meet the diversified needs of the lamps. Thus, the LEDs, the multi-diode lighting sub-modules 110 and the multi-diode lighting module 100 can be combined according to actual needs so as to generate various light environments with different qualities, light intensity, color temperatures and patterns of the light. Let FIG. 2 be taken for example. The multi-diode lighting module 300 is formed by a plurality of multi-diode lighting sub-modules 310 arranged in the form of a matrix. The multi-diode lighting sub-modules 310 are formed by the red, the green, the blue, the yellow and the orange light LEDs 311 ("R" denotes a red light, "G" denotes a green light, "B" denotes a blue light, "Y" denotes a yellow light, "O" denotes an orange light). The red, green and blue light can be mixed as a light source with a white light spectrum.

Figure 3:
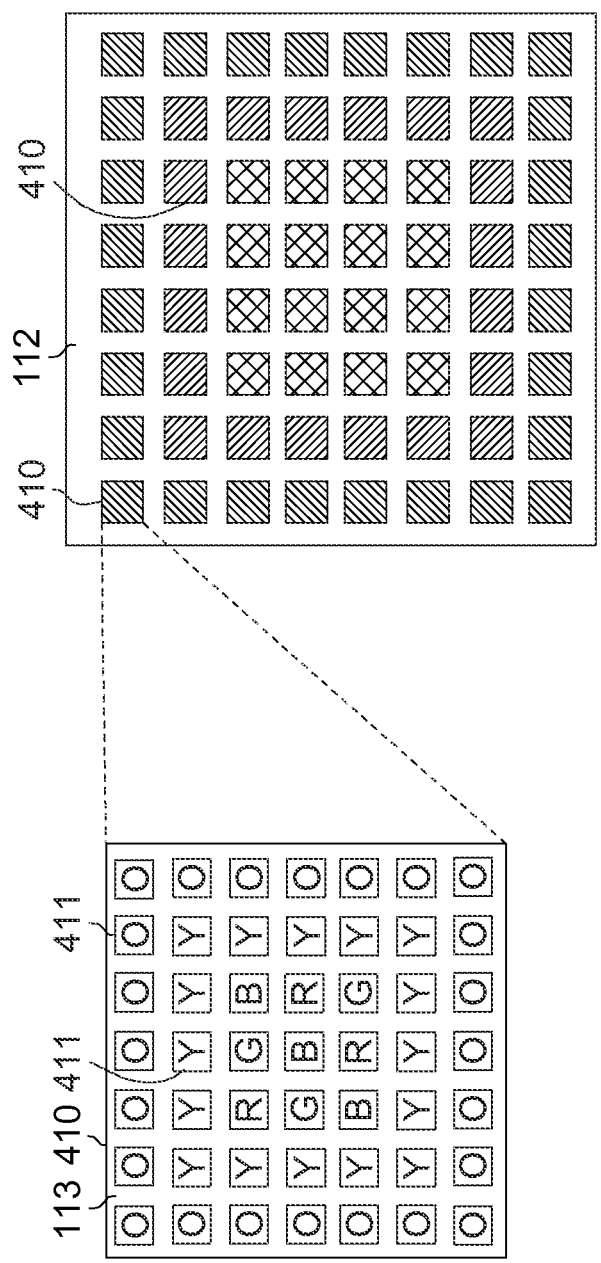

Let FIG. 3 be taken for example. The multi-diode lighting module 400 can be formed by three color temperatures or even more light source sub-modules 410 (in FIG. 3, different shadings indicate different color temperatures). The LEDs 411 can have many distributions of color temperatures and spectrums, which further form different combinations of conditions for the required light sources.

Figure 4:
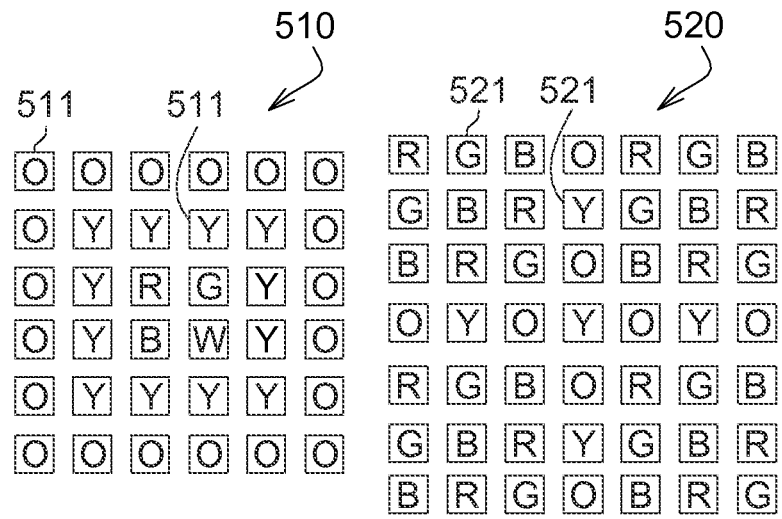

Let FIG. 4 be taken for example. The multi-diode lighting sub-modules 510 and 520 can be arranged in a multiplex configuration. Let the multi-diode lighting sub-modules 510 disposed at the left-hand side of FIG. 4 be taken for example. The multi-diode lighting sub-modules 510 can be formed by the red, the green, the blue, the white, the yellow and the orange light LEDs 511 ("W" denotes a white light). Let the multi-diode lighting sub-modules 520 disposed at the right-hand side of FIG. 4 be taken for example. The multi-diode lighting sub-module 520 can be formed by a multiplex configuration of the red, the green, blue, the yellow and the orange light LEDs 521.

Figure 5:
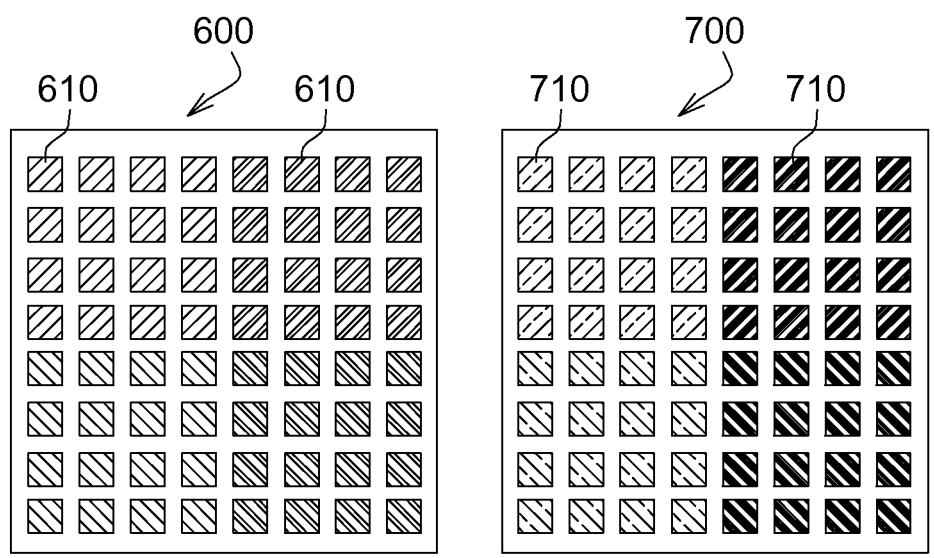

Let FIG. 5 be taken for example. The multi-diode lighting module 600 disposed at the left-hand side of FIG. 5 can be formed by the light source sub-modules 610 with different colors (different net points indicate different colors). The multi-diode lighting module 700 disposed at the right-hand side of FIG. 5 can be formed by the multi-diode lighting sub-modules 710 with different color temperatures (different net points indicate different color temperatures).

Figure 6:
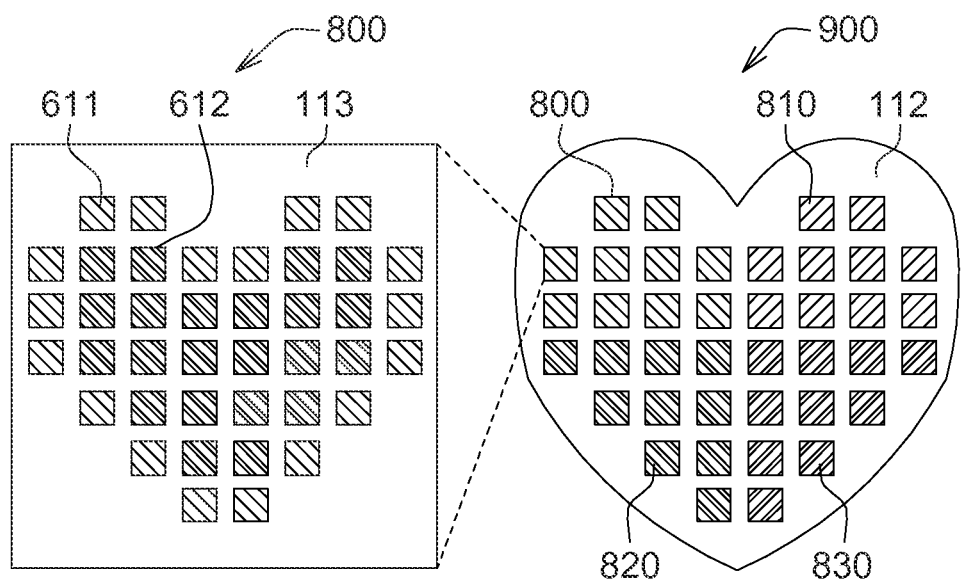

Let FIG. 6 be taken for example. The multi-diode lighting sub-modules 800 disposed at the left-hand side of FIG. 6 can be formed by the LEDs 611 and 612 different spectrums or color temperature (different net points indicate different spectrums or color temperatures). The multi-diode lighting modules 900 disposed at the right-hand side of FIG. 6 can be formed by the multi-diode lighting sub-modules 800, 810, 820 and 830 with different color temperatures or colors (different net points indicate different color temperatures or spectrums). Different patterns (such as the heart patterns) of colors or color temperatures can be generated through various dispositions or arrangements of the LEDs 611 and 612 and the multi-diode lighting sub-modules 800, 810, 820 and 830.

Figure 7:
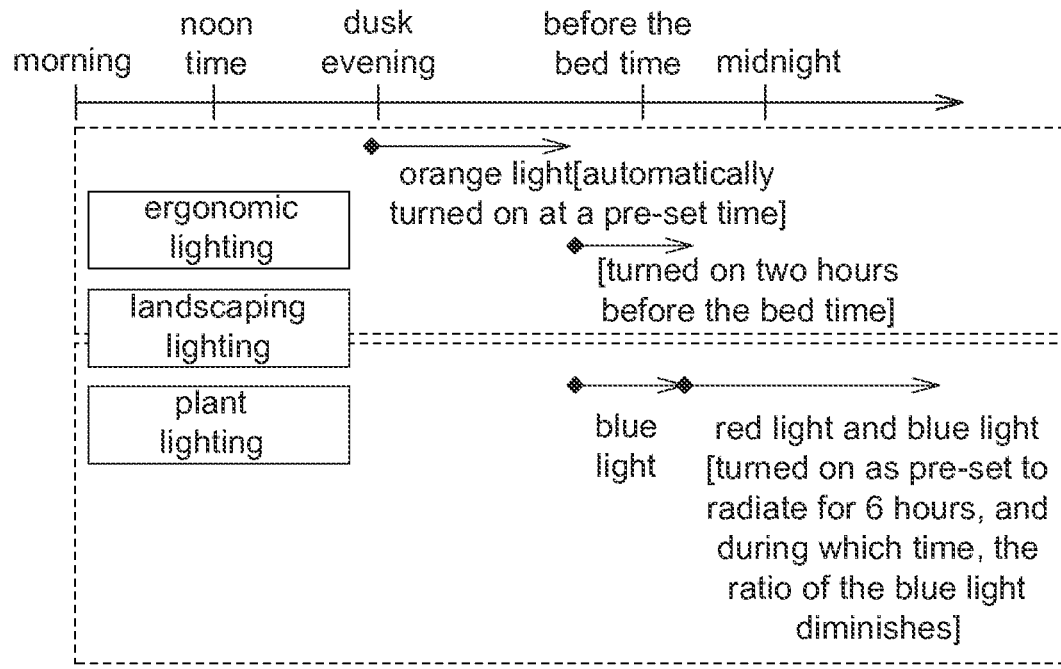
FIGS. 7 to 10 show various embodiments of the application of a lighting system.

In the application of the disclosure, the light is modulated according to the states and needs of the light environment under different scenarios. FIG. 7 shows a modulation diagram when the light system of the disclosure is implemented in a lounge. In the part of the ergonomic lighting, the light is turned off during the daytime when nobody is at home during the daytime; the orange light is automatically turned on around the dusk evening when people are off from their work and need to have a break; and the plant lighting is turned on two hours before the bed time. In the part of the plant lighting, the blue light is turned on first, and then the red light and the blue light are turned on as pre-set to radiate for 6 hours, and during which time, the ratio of the blue light diminishes. In the part of landscaping lighting, the light is generated in a customization way to fit the user's needs.

Figure 8:
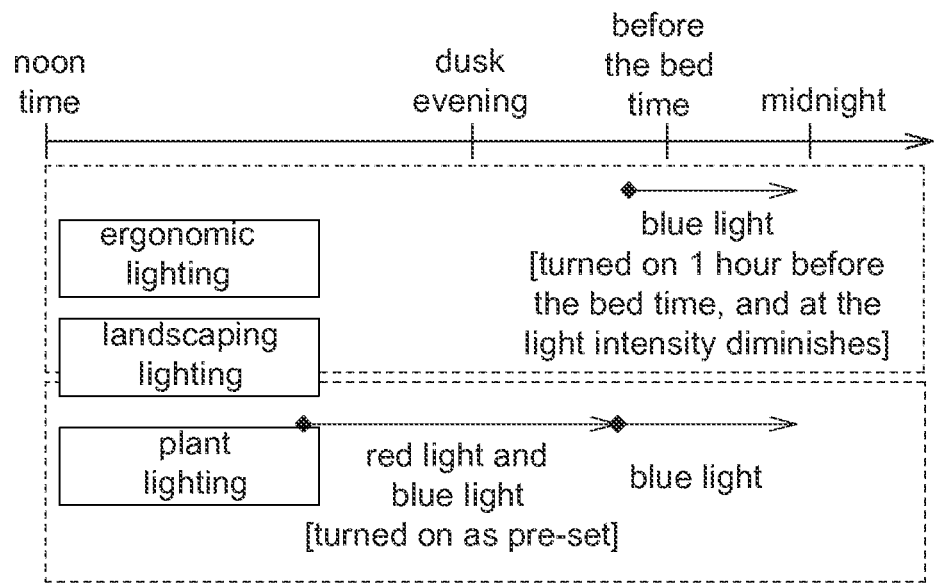

FIG. 8 shows a modulation diagram when the light system of the disclosure is implemented in a bedroom. When the plant lighting is inadequate, the red light and the blue light are turned on around the dusk evening, and the blue light is turned on 1 hour before the bed time, and at the light intensity diminishes to relax people's moods. In the part of landscaping lighting, the light is generated in a customization way to fit the user's needs.

Figure 9:
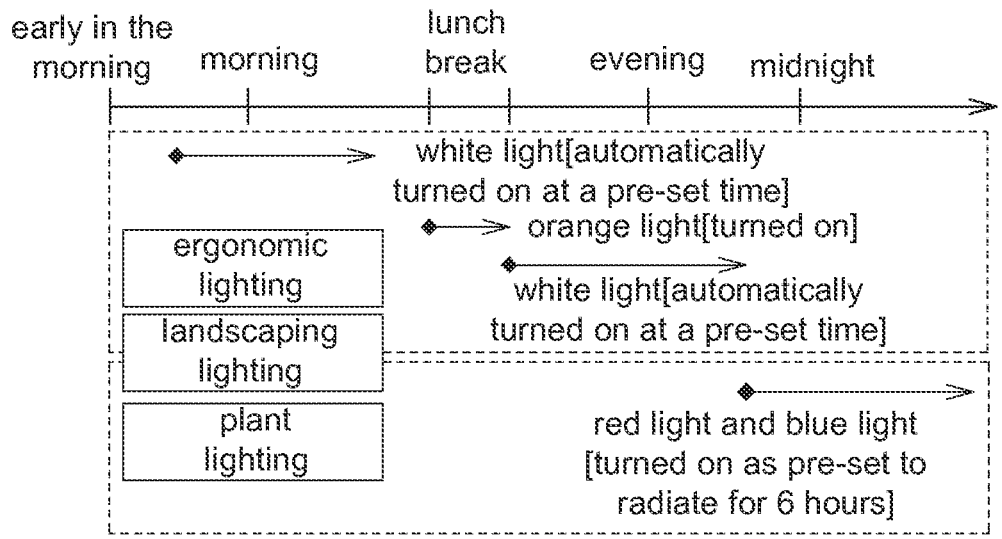

FIG. 9 shows a modulation diagram when the light system of the disclosure is implemented in an office. The white light is automatically turned on at a pre-set time in the morning. The orange light is turned on to relax people's mood during the lunch break. The white light is automatically in the afternoon and during the overtime in the evening. The plant lighting is turned on in the midnight when nobody is in the office. The red light and the blue light are turned on as pre-set to radiate for 6 hours in the night time. In the part of landscaping lighting, the light is generated in a customization way to fit the user's needs.

Figure 10:
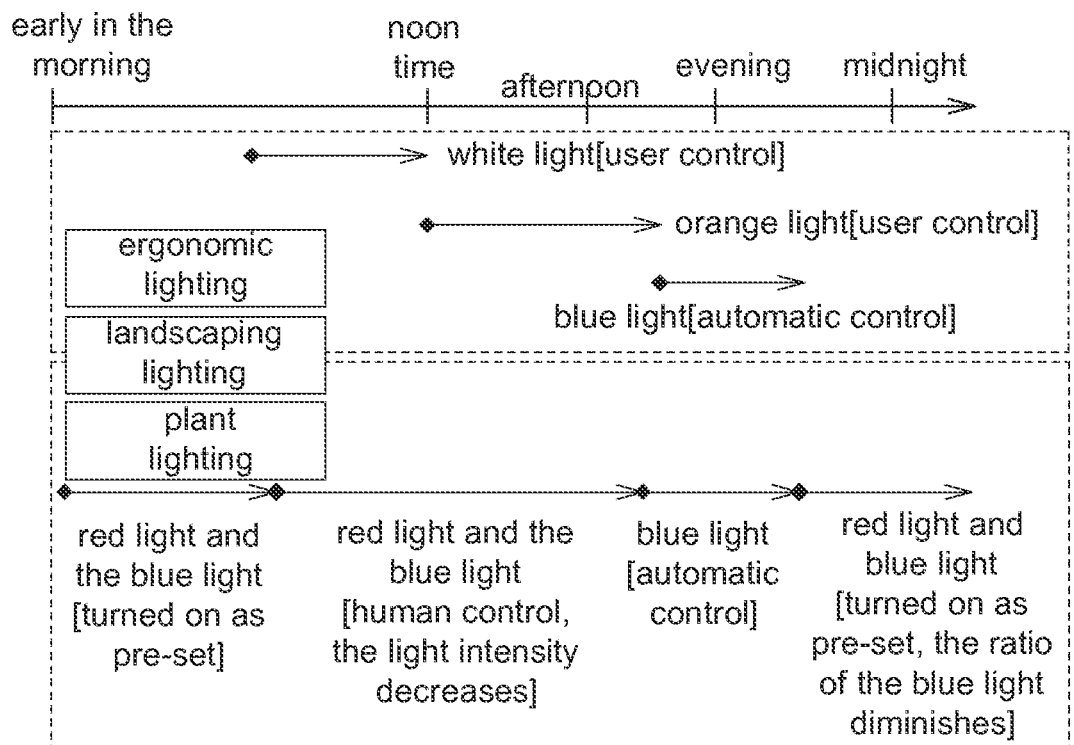

FIG. 10 shows a modulation diagram when the light system of the disclosure is implemented in a garden. The white light is turned on for reading in the morning time. The orange light is turned on for people to relax in the afternoon. The blue light is automatically turned on to give people a feeling of serenity in the evening. In the lighting part of plant, the red light and the blue light are turned automatically in the morning; the light intensity of the red light and the blue light can be dimmed by the user in the noon time and the afternoon; the blue light is automatically in the evening; the red light and the blue light are automatically in the night time, and the ratio of the blue light diminishes. In the part of landscaping lighting, the light is generated in a customization way to fit the user's needs.

A design of multiplex configuration of a multi-diode lighting module and a design of optical time domain modulation of an electric controlling system are applied to the lighting system which senses environmental conditions to change the color, the light intensity and the color-temperature of the light automatically or artificially to influence people's feelings and moods. At the same time, the environmental sensing device further feedbacks the information of humidity or temperature so that the parameter of optimum light environment can be set accordingly. Based on a diversity of specifications of the lighting lamps, landscaping modeling, and schemes of light environment, the lighting system of the disclosure adopts different designs with high flexibility for the LEDs, the multi-diode lighting sub-modules and the multi-diode lighting modules, and the products are manufactured in a customization way to provide a diversified combination and configuration. Through the varied dispositions and arrangements of the light quality, the light intensity, the color temperature of the light generated by the light source, varied combinations of designs of light patterns can be provided. Furthermore, the electric controlling system can also adjust the architecture of the elements to meet different needs, such that the lighting system can be manufactured in a customization way to meet varied requirements in the landscaping and optical designs, not only having the advantages of reducing the cost and speeding mass production, but also providing multi-functions including landscaping lighting, ergonomic lighting, plant lighting and air purifying.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lighting system, comprising:
   at least a lighting module comprising a plurality of lighting sub-modules, wherein each of the lighting sub-modules includes a plurality of light emitting diodes; and
   an electric controlling system, comprising:
   a lighting module control unit, which modulates a light quality, a light intensity and a color temperature of a light generated by the lighting module, a light quality, a light intensity and a color temperature of a light generated by one of the lighting sub-modules, and a light quality, a light intensity and a color temperature of a light generated by part of the light sub-modules;
   wherein a light quality of a light generated by one of the light emitting diodes is modulated by the lighting module control unit;
   a light intensity of a light generated by one of the light emitting diodes is modulated by the lighting module control unit; and
   a color temperature of a light generated by one of the light emitting diodes is modulated by the lighting module control unit.

2. The lighting system according to claim 1, wherein the light emitting diodes have different color temperatures or different spectrums.

3. The lighting system according to claim 1, wherein the electric controlling system further includes:
   an environment sensing unit, which senses an environmental condition for controlling the lighting module, the light sub-modules or the light emitting diodes accordingly.

4. The lighting system according to claim 3, wherein the environmental condition comprises a temperature, a humidity, an illumination, or a moving state of a human body in a space.

5. The lighting system according to claim 1, wherein the electric controlling system further comprises:
   a time domain control unit, which controls the lighting module or the lighting sub-modules according to a time parameter.

6. The lighting system according to claim 5, wherein the time domain control unit modulates a ratio of a red light to a blue light according to the time parameter.

7. The lighting system according to claim 5, wherein the electric controlling system further comprises:
   an environment sensing unit, which senses an environmental condition, wherein the time domain control unit modulates the time parameter according to the environmental condition.

8. The lighting system according to claim 1, wherein the electric controlling system further comprises:
   an operation controlling unit, which modulates the light intensity, the light quality or the color temperature of the light generated by the lighting module, the lighting sub-modules or the light emitting diodes according to a setting of the lighting module, the lighting sub-modules or the light emitting diodes.

9. The lighting system according to claim 1, wherein the electric controlling system further comprises:
   a memory database unit in which a light environment time domain parameter is stored.

10. The lighting system according to claim 1, wherein the lighting module further comprises:
    at least a substrate on which the lighting sub-modules are disposed.

11. The lighting system according to claim 10, wherein each of the lighting sub-modules includes the light emitting diodes with different wavelengths or color temperatures.

12. The lighting system according to claim 11, wherein each of the light emitting diodes is a light emitting diode chip, a light emitting diode package or a light emitting diode manufactured by a substrate integrated process.

13. The lighting system according to claim 12, wherein the light emitting diodes are disposed on the substrate.

14. A controlling method of a lighting system, wherein the lighting system includes at least a lighting module, the lighting module includes at least one lighting sub-module, the lighting sub-module includes a plurality of light emitting diodes, and the controlling method comprises:
    modulating a light quality, a light intensity, a color temperature of a light generated by the lighting module;
    modulating a light quality, a light intensity and a color temperature of a light generated by the at least one lighting sub-module;
    modulating a light quality of a light generated by one of the light emitting diodes;
    modulating a light intensity of a light generated by one of the light emitting diodes; and
    modulating a color temperature of a light generated by one of the light emitting diodes.

15. The controlling method according to claim 14, further comprises:
    controlling the lighting module, the at least one lighting sub-module, or the light emitting diodes according to a time parameter.

16. The controlling method according to claim 15, further comprising:
    controlling a ration of a red light and a blue light according to the time parameter.

17. The controlling method according to claim 15, further comprising:
    sensing an environmental condition for modulating the time parameter accordingly.

18. The controlling method according to claim 14, further comprising:
    sensing an environmental condition for controlling the lighting module, the at least one lighting sub-module, or the light emitting diodes accordingly.

19. The controlling method according to claim 14, further comprising:
    inputting a setting value, wherein the lighting module, the at least one lighting sub-module or the lighting emitting diodes are controlled according to the setting value.

20. The controlling method according to claim 19, further comprising:
    storing the setting value, wherein the lighting module, the at least one lighting sub-module or the lighting emitting diodes are controlled according to the setting value.

* * * * *